US009755806B2

United States Patent
Cui et al.

(10) Patent No.: US 9,755,806 B2
(45) Date of Patent: Sep. 5, 2017

(54) CHANNEL INFORMATION FEEDBACK METHOD, USER EQUIPMENT, METHOD FOR SENDING DATA, AND BASE STATION

(75) Inventors: Qimei Cui, Beijing (CN); Hui Wang, Beijing (CN); Xiaofeng Tao, Beijing (CN); Shan Yang, Beijing (CN); Xiaona Li, Beijing (CN); Shiyuan Li, Beijing (CN)

(73) Assignee: SONY CORPORATION, Tokyo (JP)

( * ) Notice: Subject to any disclaimer, the term of this patent is extended or adjusted under 35 U.S.C. 154(b) by 149 days.

(21) Appl. No.: 14/238,560

(22) PCT Filed: Jul. 30, 2012

(86) PCT No.: PCT/CN2012/079340
§ 371 (c)(1),
(2), (4) Date: Feb. 12, 2014

(87) PCT Pub. No.: WO2013/026347
PCT Pub. Date: Feb. 28, 2013

(65) Prior Publication Data
US 2014/0211653 A1    Jul. 31, 2014

(30) Foreign Application Priority Data
Aug. 22, 2011    (CN) .......................... 2011 1 0244438

(51) Int. Cl.
*H04L 5/00*    (2006.01)
*H04W 72/08*    (2009.01)
(Continued)

(52) U.S. Cl.
CPC .......... *H04L 5/0057* (2013.01); *H04L 5/0035* (2013.01); *H04W 24/08* (2013.01);
(Continued)

(58) Field of Classification Search
None
See application file for complete search history.

(56) References Cited

U.S. PATENT DOCUMENTS

| 2011/0237282 | A1 | 9/2011 | Geirhofer et al. |
| 2011/0244847 | A1 | 10/2011 | Mallik et al. |
| 2013/0258897 | A1* | 10/2013 | Park ..................... H04B 7/0626 370/252 |

FOREIGN PATENT DOCUMENTS

| WO | WO 2011/041759 A1 | 4/2011 |
| WO | WO 2011/044526 A1 | 4/2011 |
| WO | WO/2011/085516 | * 7/2011 |

OTHER PUBLICATIONS

International Search Report issued Nov. 8, 2012, in PCT/CN12/079340 filed Jul. 30, 2012.

* cited by examiner

*Primary Examiner* — Christine Duong
(74) *Attorney, Agent, or Firm* — Oblon, McClelland, Maier & Neustadt, L.L.P.

(57) ABSTRACT

A method and system for feeding back channel information to coordinated cells, the method including: measuring channel qualities of downlink channels between coordinated cells and user equipment; classifying the coordinated cells into different coordinated cell classes according to the measured channel qualities; based on different channel quality intervals corresponding to different coordinated cell classes, respectively selecting channel information feedback modes with different feedback enhancement degrees for different coordinated cell classes; and using the selected channel information feedback modes with different feedback enhancement degrees to determine the channel information to be fed back to the coordinated cells in each coordinated
(Continued)

cell class according to a pre-determined order, and sending the determined channel information to the coordinated cells.

14 Claims, 9 Drawing Sheets

(51) Int. Cl.
  *H04W 24/08* (2009.01)
  *H04W 72/04* (2009.01)
  *H04L 1/00* (2006.01)
(52) U.S. Cl.
  CPC ......... *H04W 72/085* (2013.01); *H04L 1/0026* (2013.01); *H04W 72/0426* (2013.01)

CHANNEL INFORMATION FEEDBACK METHOD, USER EQUIPMENT, METHOD FOR SENDING DATA, AND BASE STATION

FIELD OF THE INVENTION

The present invention generally relates to the field of wireless communications, and more specifically to a method of feeding back channel information to coordinated cells and a user equipment thereof, and a method of transmitting data to a user equipment in coordinated cells and a base station thereof.

BACKGROUND OF THE INVENTION

LTE-A (Long Term Evolution-Advanced), an evolution of UMTS (Universal Mobile Telecommunication System), is the largest new project developed by the 3GPP (3rd Generation Partnership Project) over recent years. It has certain features of the fourth generation of telecommunications (4G), and even can be regarded as a "pre-4G" technology. LTE-A improves and enhances the air interface of 3G, using OFDM (Orthogonal frequency-division multiplexing) and MIMO (multiple-input and multiple-output) as the basic technologies of the evolution of wireless network, which can provide a better solution to intra-cell interference, and achieve higher network capacity, faster peak data rate and wider network coverage in comparison with CDMA (Code division multiple access). But these come at the expense of more severe ICI (Inter-Cell Interference) brought by OFDM system than that by CDMA system.

CoMP (Coordinated Multipoint Transmission) is one of the key technologies of LTE-A. It can effectively solve the ICI problem, and increase cell throughput and cell-edge user data rates. FIG. 1 illustrates the joint processing/transmission of CoMP. Data information of a particular user is shared among coordinated cells, and the entire cluster of coordinated cells together serve a user or multiple users, thereby reducing ICI and improving cell-edge user performance. However, in order to implement CoMP, it is necessary for a base station to acquire all the channel information between each of users and the base station within the coordination region. The channel information feedback enables the system to perform precise resource scheduling and good link adaptation, which leads to improved downlink performance. However, the channel information feedback also incurs additional overhead on PUSCH (Physical Uplink Shared Channel), which results in degraded uplink spectral efficiency. Therefore, it is desired to provide a proper feedback scheme to reduce the amount of feedback of the system and improve the system spectral efficiency on the premise that the base station can acquire precise channel information.

SUMMARY OF THE INVENTION

Since channel information feedback in LTE-A is optimized for MIMO, CoMP joint processing/transmission using the per-cell feedback scheme yields a poor result, with a throughput even less than a non-CoMP system. Generally, there are two feedback schemes for CoMP joint processing/transmission. One is still a per-cell feedback scheme, except that joint optimization is used in the determination of the channel information to be fed back; however, as the number of coordinated cells increases, the complexity of the joint determination of the channel information to be fed back grows exponentially, making it unfeasible in an actual implementation. The other uses additional channel information to be feed back, specifically, phase correction angle information among coordinated cells is fed back in addition to the channel information by the per-cell feedback, resulting in the drawback of largely increased amount of feedback information. However, both schemes fail to address the difference in channel quality between different coordinated cells to the user equipment (UE). For those coordinated cells with relatively low channel quality, there is no need to enhance the feedback because the gain resulted from the coordinated cells with low channel quality is little. To the contrary, for those coordinated cells with relatively high channel quality, feedback enhancement is desired.

Based on the analysis above, the present invention individually carries out different channel information feedback to coordinated cells with different channel qualities according to the channel qualities measured by the UE from the coordinated cells to the UE. By use of the present invention, not only feedback complexity and feedback overhead can be lowered, but also system performance can be improved significantly.

According to an embodiment of the present invention, it is provided a method of feeding back channel information to coordinated cells, including: measuring channel quality of downlink channels between the coordinated cells and a user equipment; classifying the coordinated cells into different coordinated cell classes based on a measurement result of the channel quality; selecting, based on different channel quality intervals corresponding to the different coordinated cell classes, channel information feedback modes with different levels of feedback enhancement for the different coordinated cell classes, respectively; and determining channel information to be fed back to coordinated cells in respective coordinated cell classes in a predetermined order with use of the selected channel information feedback modes with different levels of feedback enhancement, and transmitting the determined channel information to the coordinated cells.

According to an embodiment of the present invention, wherein the step of selecting includes: selecting a channel information feedback mode with a higher level of feedback enhancement for a coordinated cell class corresponding to a channel quality interval with higher channel quality, while selecting a channel information feedback mode with a lower level of feedback enhancement for a coordinated cell class corresponding to a channel quality interval with lower channel quality.

According to an embodiment of the present invention, wherein the step of determining includes: determining channel information to be fed back to coordinated cells in respective coordinated cell classes corresponding to the different channel quality intervals, in a descending order of the channel quality of the different channel quality intervals.

According to an embodiment of the present invention, wherein the step of determining further includes: determining channel information to be fed back to coordinated cells in a second coordinated cell class with use of determined channel information to be fed back to coordinated cells in a first coordinated cell classes, wherein channel quality of the first coordinated cell class is higher than channel quality of the second coordinated cell class.

According to an embodiment of the present invention, wherein the channel information feedback modes indicate contents of the channel information to be fed back and/or calculation manners for calculating the channel information to be fed back.

According to an embodiment of the present invention, wherein the channel information to be fed back includes at least one of effective channel quantization information and phase correction angle information.

According to an embodiment of the present invention, wherein the calculation manners are one of the following: jointly optimizing the effective channel quantization information and the phase correction angle information simultaneously; and calculating the effective channel quantization information independently, and then jointly calculating the phase correction angle information based on the calculated effective channel quantization information.

According to an embodiment of the present invention, it is provided a user equipment of feeding back channel information to coordinated cells, including: a measurement unit configured to measure channel quality of downlink channels between the coordinated cells and a user equipment; a classification unit configured to classify the coordinated cells into different coordinated cell classes based on a measurement result of the channel quality; a selection unit configured to select, based on different channel quality intervals corresponding to the different coordinated cell classes, channel information feedback modes with different levels of feedback enhancement for the different coordinated cell classes, respectively; and a determination unit configured to determine channel information to be fed back to coordinated cells in respective coordinated cell classes in a predetermined order with use of the selected channel information feedback modes with different levels of feedback enhancement, and transmit the determined channel information to the coordinated cells.

According to an embodiment of the present invention, it is provided a method of transmitting data to a user equipment in coordinated cells, including: transmitting measurement parameters to the user equipment; receiving channel information fed back by the user equipment to the coordinated cells in accordance with the channel information feedback method above after receiving the measurement parameters; and calculating a pre-coding matrix using the channel information and transmitting the data to the user equipment with the pre-coding matrix.

According to an embodiment of the present invention, it is provided a base station of transmitting data to a user equipment in coordinated cells, including: a transmission unit configured to transmit measurement parameters to the user equipment; a reception unit configured to receive channel information fed back by the user equipment to the coordinated cells in accordance with the channel information feedback method above after receiving the measurement parameters; and a calculation unit configured to calculate a pre-coding matrix using the channel information and transmit the data to the user equipment with the pre-coding matrix.

According to an embodiment of the present invention, it is provided a wireless communication method including: transmitting, by base stations in coordinated cells, measurement parameters to a user equipment; feeding back, by the user equipment, channel information to the coordinated cells in accordance with the channel information feedback method above after receiving the measurement parameters; and calculating, by the base stations in the coordinated cells, after receiving the channel information, a pre-coding matrix using the channel information, and transmitting data to the user equipment with the pre-coding matrix.

According to an embodiment of the present invention, it is provided a wireless communication system, including: base stations in coordinated cells; and a user equipment, wherein the base stations transmit measurement parameters to the user equipment, receive channel information fed back by the user equipment, calculate a pre-coding matrix using the channel information and transmit data to the user equipment with the pre-coding matrix; and the user equipment feeds back the channel information to the coordinated cells in accordance with the channel information feedback method above after receiving the measurement parameters.

According to an embodiment of the present invention, it is provided a computer-readable storage medium with a computer-readable instruction for executing the steps of the method above.

BRIEF DESCRIPTION OF THE DRAWINGS

The above and other objects, characteristics and advantages of the present invention will become more apparent from the following description of the embodiments with reference to the accompanying drawings, where the same or corresponding technical features or components are indicated by the same or corresponding reference numerals.

DETAILED DESCRIPTION OF THE EMBODIMENTS

The embodiments of the invention will be described hereinafter in conjunction with the accompanying drawings. It is noted that components and processes that are not related to the present invention or known to those skilled in the art are omitted from the accompanying drawings and the description for the purpose of clarity.

First Embodiment

Figure 1:
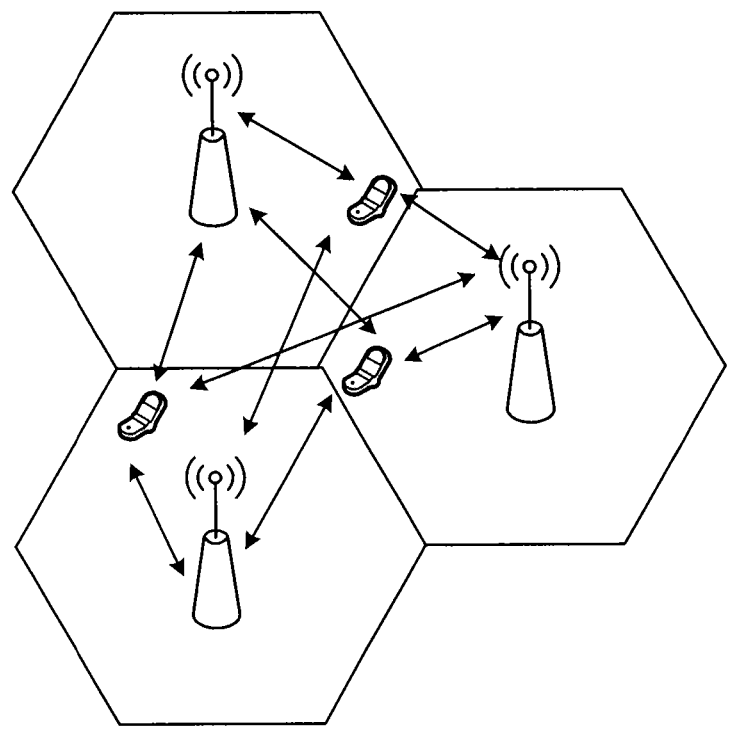
FIG. 1 is a schematic diagram illustrating CoMP joint processing in the prior art.
Figure 2:
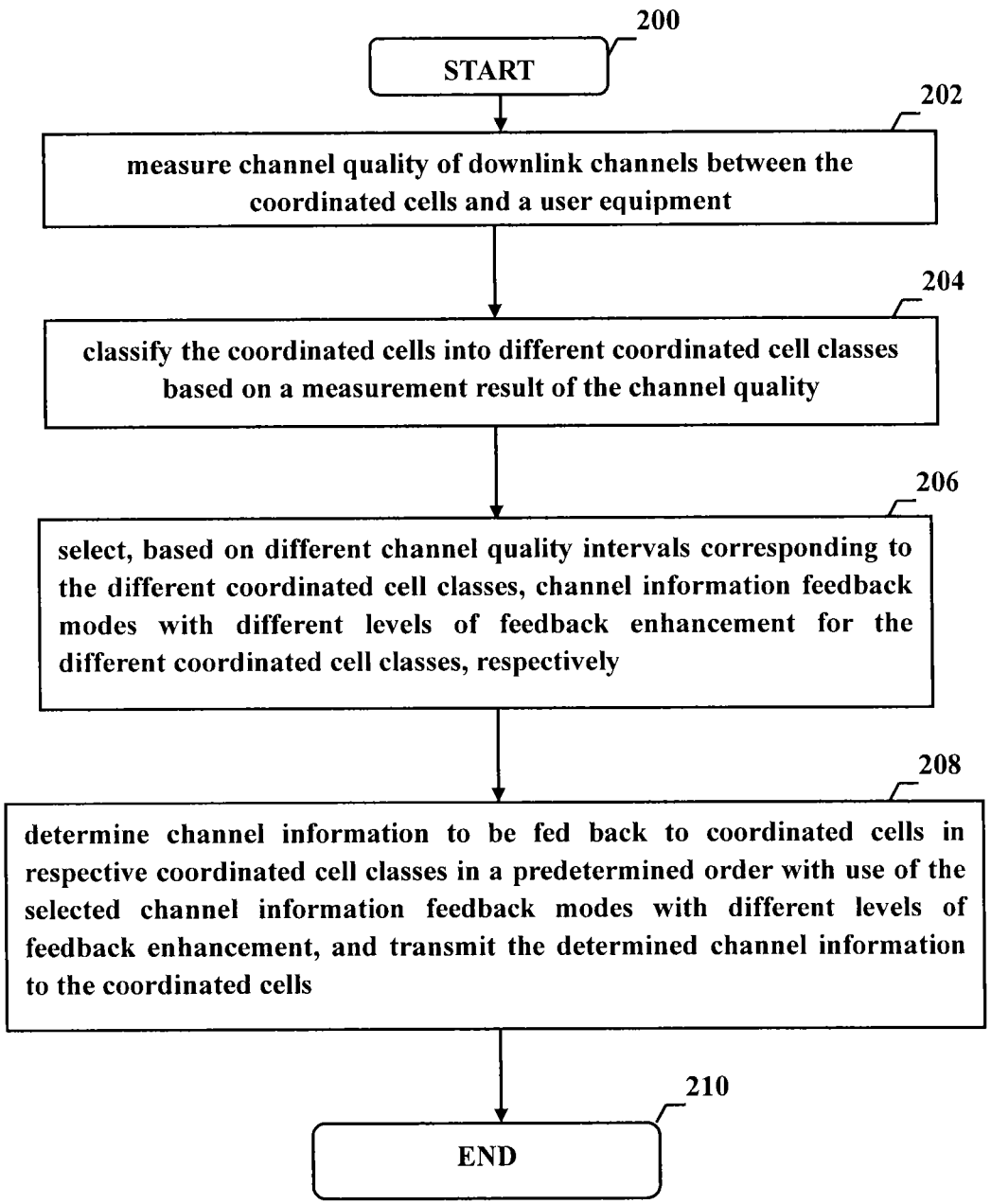
FIG. 2 is a flow chart illustrating a method of feeding back channel information according to a first embodiment of the present invention.

The first embodiment of the present invention is described below in conjunction with FIG. 2. With reference to FIG. 2, FIG. 2 is a flow chart illustrating a method of feeding back channel information according to a first embodiment of the present invention.

The method starts in step 200. In step 202, channel quality of downlink channels between coordinated cells and a user equipment is measured.

The channel quality may be represented by a number of parameters such as SNR (Signal-to-noise ratio), SIR (Signal-to-interference ratio), SINR (Signal to Interference plus Noise ratio), or SLNR (Signal-to-leakage-and-noise ratio) and so on.

The UE may measure the channel quality of downlink channels between the coordinated cells and the UE using measurement parameters such as measurement bandwidth or feedback period and so on, transmitted from the coordinated cells to the UE. In addition, the measurement parameters may also be preset in the UE. It is noted that the measurement parameters are not necessary for measuring the channel quality, i.e., channel quality measurement can also be carried out without the measurement parameters. Those skilled in the art will appreciate that various channel quality measurement methods known in the art can be used to measure the channel quality of downlink channels between the coordinated cells and the UE, as long as the channel quality of downlink channels between the coordinated cells and the UE can be obtained.

Then, in step 204, the coordinated cells are classified into different coordinated cell classes based on a measurement result of the channel quality.

For example, T−1 channel quality thresholds can be set, where T is a natural number which is equal to or greater than 2. Based on the T−1 channel quality thresholds, T channel quality intervals may be obtained, each of which corresponds to a coordinated cell class. By comparing the measured channel quality and the channel quality thresholds, it is determined to which channel quality interval the measured channel quality belongs, so that a coordinated cell corresponding to the measured channel quality is classified into a coordinated cell class corresponding to the channel quality interval to which the channel quality belongs.

Specifically, assuming T=3, two channel quality thresholds $T_1$ and $T_2$ may be set. Assuming $T_1<T_2$, three channel quality intervals $S_1$, $S_2$ and $S_3$ may be obtained, where $S_1$ is the interval of less than or equal to $T_1$, $S_2$ is the interval of greater than $T_1$ but less than or equal to $T_2$, and $S_3$ is the interval of greater than $T_2$. Assuming there are six coordinated cells $C_1$-$C_6$, and the measured channel qualities of the coordinated cells $C_1$ and $C_2$ belong to the channel quality interval $S_1$, the measured channel qualities of the coordinated cells $C_3$ and $C_4$ belong to the channel quality interval $S_2$, and the measured channel qualities of the coordinated cells $C_5$ and $C_6$ belong to the channel quality interval $S_3$, then the coordinated cells $C_1$ and $C_2$ are classified as a coordinated cell class $G_1$ corresponding to the channel quality interval $S_1$, the coordinated cells $C_3$ and $C_4$ are classified as a coordinated cell class $G_2$ corresponding to the channel quality interval $S_2$, and the coordinated cells $C_5$ and $C_6$ are classified as a coordinated cell class $G_3$ corresponding to the channel quality interval $S_3$.

Those skilled in the art will appreciate that the coordinated cells can be classified based on the channel quality in other manners, as long as the different coordinated cell classes obtained by classification can distinguish high and low channel qualities. Moreover, the classification of coordinated cells can be performed statically, or semi-statically, depending on the rate at which the channel quality changes.

Then, in step 206, based on different channel quality intervals corresponding to the different coordinated cell classes, channel information feedback modes with different levels of feedback enhancement are selected for the different coordinated cell classes.

In the example above, based on the channel quality interval $S_1$ corresponding to the coordinated cell class $G_1$, a first channel information feedback mode may be selected for the coordinated cell class $G_1$; based on the channel quality interval $S_2$ corresponding to the coordinated cell class $G_2$, a second channel information feedback mode may be selected for the coordinated cell class $G_2$; and based on the channel quality interval $S_3$ corresponding to the coordinated cell class $G_3$, a third channel information feedback mode may be selected for the coordinated cell class $G_3$, wherein the first channel information feedback mode, the second channel information feedback mode and the third channel information feedback mode have different levels of feedback enhancement, resulting in different accuracies of channel information feedback.

Preferably, the channel information feedback mode with a higher level of feedback enhancement is selected for a coordinated cell class corresponding to the channel quality interval with higher channel quality, while a channel information feedback mode with a lower level of feedback enhancement is selected for a coordinated cell class corresponding to the channel quality interval with lower channel quality.

Then, in the example above, since the channel qualities in the channel quality intervals $S_1$, $S_2$ and $S_3$ have the following relation: $S_1<S_2<S_3$, the first channel information feedback mode with the lowest level of feedback enhancement may be selected for the coordinated cell class $G_1$ corresponding to the channel quality interval $S_1$ with the lowest channel quality; the second channel information feedback mode with a moderate level of feedback enhancement may be selected for the coordinated cell class $G_2$ corresponding to the channel quality interval $S_2$ with moderate channel quality; and the third channel information feedback mode with the highest level of feedback enhancement may be selected for the coordinated cell class $G_3$ corresponding to the channel quality interval $S_3$ with the highest channel quality. Therefore, for the coordinated cell class $G_1$, since its corresponding channel quality interval $S_1$ has the lowest channel quality, so the first channel information feedback mode selected for the coordinated cell class has the lowest level of feedback enhancement, resulting in the lowest accuracy of channel information feedback. Similarly, for the coordinated cell class $G_2$, since its corresponding channel quality interval $S_2$ has the moderate channel quality, so the second channel information feedback mode selected for the coordinated cell class has the moderate level of feedback enhancement, resulting in the moderate accuracy of channel information feedback. Similarly, for the coordinated cell class $G_3$, since its corresponding channel quality interval $S_3$ has the highest channel quality, so the third channel information feedback mode selected for the coordinated cell class has the highest level of feedback enhancement, resulting in the highest accuracy of channel information feedback. Therefore, feedback enhancement is relatively small for the coordinated cells with low channel quality, because the gain resulted from the coordinated cells with low channel quality is little. To the contrary, feedback enhancement is relatively great for the coordinated cells with relatively high channel quality.

Then, in step 208, channel information to be fed back to coordinated cells in respective coordinated cell classes is determined in a predetermined order with use of the selected channel information feedback modes with different levels of feedback enhancement, and the determined channel information is transmitted to the coordinated cells.

In the example above, for the coordinated cell class $G_1$, channel information to be fed back to the coordinated cells $C_1$ and $C_2$ in the coordinated cell class $G_1$ is determined with use of the selected first channel information feedback mode. Similarly, for the coordinated cell class $G_2$, channel information to be fed back to the coordinated cells $C_3$ and $C_4$ in the coordinated cell class $G_2$ is determined with use of the selected second channel information feedback mode. Similarly, for the coordinated cell class $G_3$, channel information to be fed back to the coordinated cells $C_5$ and $C_6$ in the coordinated cell class $G_3$ is determined with use of the selected third channel information feedback mode. Moreover, for the coordinated cell classes $G_1$, $G_2$ and $G_3$, channel information to be fed back is not determined at the same time, but in a predetermined order.

Preferably, channel information to be fed back to coordinated cells in respective coordinated cell classes corresponding to the different channel quality intervals is determined in a descending order of the channel quality of the different channel quality intervals.

In the example above, for the coordinated cell classes $G_1$, $G_2$ and $G_3$, since the channel qualities in the corresponding channel quality intervals $S_1$, $S_2$ and $S_3$ have the following relation: $S_1 < S_2 < S_3$, channel information to be fed back to the coordinated cells $C_5$ and $C_6$ in the coordinated cell class $G_3$ corresponding to the channel quality interval $S_3$ with the highest channel quality is determined first, then channel information to be fed back to the coordinated cells $C_3$ and $C_4$ in the coordinated cell class $G_2$ corresponding to the channel quality interval $S_2$ with the moderate channel quality is determined, and channel information to be fed back to the coordinated cells $C_1$ and $C_2$ in the coordinated cell class $G_1$ corresponding to the channel quality interval $S_1$ with the lowest channel quality is determined last.

Those skilled in the art will appreciate that the determination order above is for illustrative purposes only, and the present invention is not limited to the determination order as described above.

Preferably, channel information to be fed back to coordinated cells in a second coordinated cell class is determined with use of determined channel information to be fed back to coordinated cells in a first coordinated cell classes, wherein channel quality of the first coordinated cell class is higher than channel quality of the second coordinated class.

In the example above, assuming channel information to be fed back to the coordinated cells $C_5$ and $C_6$ in the coordinated cell class $G_3$ has been determined, channel information to be fed back to the coordinated cells $C_3$ and $C_4$ in the coordinated cell class $G_2$ may be determined with use of determined channel information to be fed back to the coordinated cells $C_5$ and $C_6$ in the coordinated cell class $G_3$. Similarly, channel information to be fed back to the coordinated cells $C_1$ and $C_2$ in the coordinated cell class $G_1$ may be determined with use of determined channel information to be fed back to the coordinated cells $C_5$ and $C_6$ in the coordinated cell class $G_3$, as well as determined channel information to be fed back to the coordinated cells $C_3$ and $C_4$ in the coordinated cell class $G_2$. That is, channel information to be fed back to coordinated cells in a second coordinated cell class may be determined with use of determined channel information to be fed back to coordinated cells in a plurality of the first coordinated cell classes, wherein each channel quality of a plurality of the first coordinated cell classes is higher than channel quality of the second coordinated class.

Those skilled in the art will appreciate that the manner above in which determined channel information is used is for illustrative purposes only, and the present invention is not limited to the manner as described above. For example, channel information to be fed back to the coordinated cells $C_1$ and $C_2$ in the coordinated cell class $G_1$ may be determined with use of only determined channel information to be fed back to the coordinated cells $C_5$ and $C_6$ in the coordinated cell class $G_3$, or only determined channel information to be fed back to the coordinated cells $C_3$ and $C_4$ in the coordinated cell class $G_2$. That is, channel information to be fed back to coordinated cells in a second coordinated cell class may be determined with use of only determined channel information to be fed back to coordinated cells in one of a plurality of the second coordinated cell classes, wherein each channel quality of a plurality of the first coordinated cell classes is higher than channel quality of the second coordinated class.

Preferably, the channel information feedback modes indicate contents of the channel information to be fed back and/or calculation manners for calculating the channel information to be fed back.

Assuming there are two kinds of channel information to be fed back $F_1$ and $F_2$, it may be selected to feed back only one of the two kinds of channel information to be fed back $F_1$ and $F_2$, e.g., only the channel information $F_1$ or only the channel information $F_2$; or, it may be selected to feed back both the channel information $F_1$ and the channel information $F_2$. Those skilled in the art will appreciate that the more the kinds of the contents of the channel information to be fed back are, the higher the accuracy of the feedback is, and thus the higher the level of feedback enhancement is, but the higher the computing complexity is.

In the case where there are two kinds of channel information $F_1$ and $F_2$, when the channel information to be fed back includes both the channel information to be fed back $F_1$ and the channel information to be fed back $F_2$, the channel information to be fed back $F_1$ and $F_2$ may be calculated in a calculation manner where the channel information to be fed back $F_1$ and $F_2$ are jointly optimized simultaneously; or in a hierarchical calculation manner where one of the channel information to be fed back $F_1$ and $F_2$ is calculated first, and then the other of the channel information to be fed back $F_1$ and $F_2$ is calculated based on the one that has been calculated. For example, the channel information to be fed back $F_1$ may be calculated first, and then the channel information to be fed back $F_2$ is calculated based on the calculated $F_1$; alternatively, the channel information to be fed back $F_2$ may be calculated first, and then the channel information to be fed back $F_1$ is calculated based on the calculated $F_2$. Those skilled in the art will appreciate that the calculation manner with joint optimization, in comparison with the hierarchical calculation manner, can result in higher accuracy of the feedback, higher level of feedback enhancement, but higher computing complexity.

Preferably, the channel information to be fed back includes at least one of effective channel quantization information and phase correction angle information.

For example, it may be selected to feed back only one of the effective channel quantization information and the phase correction angle information, e.g., only the effective channel quantization information; or, it may be selected to feed back both the effective channel quantization information and the phase correction angle information.

Preferably, the effective channel quantization information and the phase correction angle information may be jointly optimized simultaneously; or, the effective channel quantization information may be calculated first separately, and then the phase correction angle information is calculated jointly based on the calculated effective channel quantization information.

Finally, the method ends in step 210.

Second Embodiment

Figure 3:
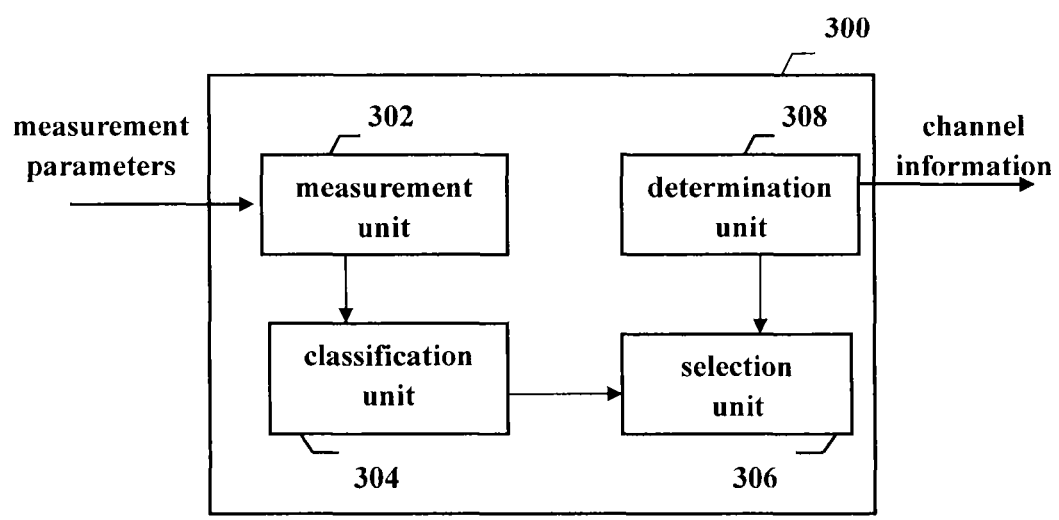
FIG. 3 is a block diagram illustrating a user equipment according to a second embodiment of the present invention.

The second embodiment of the present invention is described below in conjunction with FIG. 3. FIG. 3 is a block diagram illustrating a user equipment of feeding back channel information to coordinated cells according to the second embodiment of the present invention.

As shown in FIG. 3, the user equipment 300 includes a measurement unit 302, a classification unit 304, a selection unit 306 and a determination unit 308. The measurement unit 302 is configured to measure channel quality of downlink channels between the coordinated cells and a user equipment; the classification unit 304 is configured to classify the coordinated cells into different coordinated cell classes based on a measurement result of the channel quality; the selection unit 306 is configured to select, based on different channel quality intervals corresponding to the different coordinated cell classes, channel information feedback modes with different levels of feedback enhancement for the different coordinated cell classes, respectively; and the determination unit 308 is configured to determine channel information to be fed back to coordinated cells in respective coordinated cell classes in a predetermined order with use of the selected channel information feedback modes with different levels of feedback enhancement, and transmit the determined channel information to the coordinated cells.

The user equipment 300 according to the second embodiment of the present invention corresponds to the method according to the first embodiment of the present invention, and thus the details thereof are omitted here.

Third Embodiment

Figure 4:
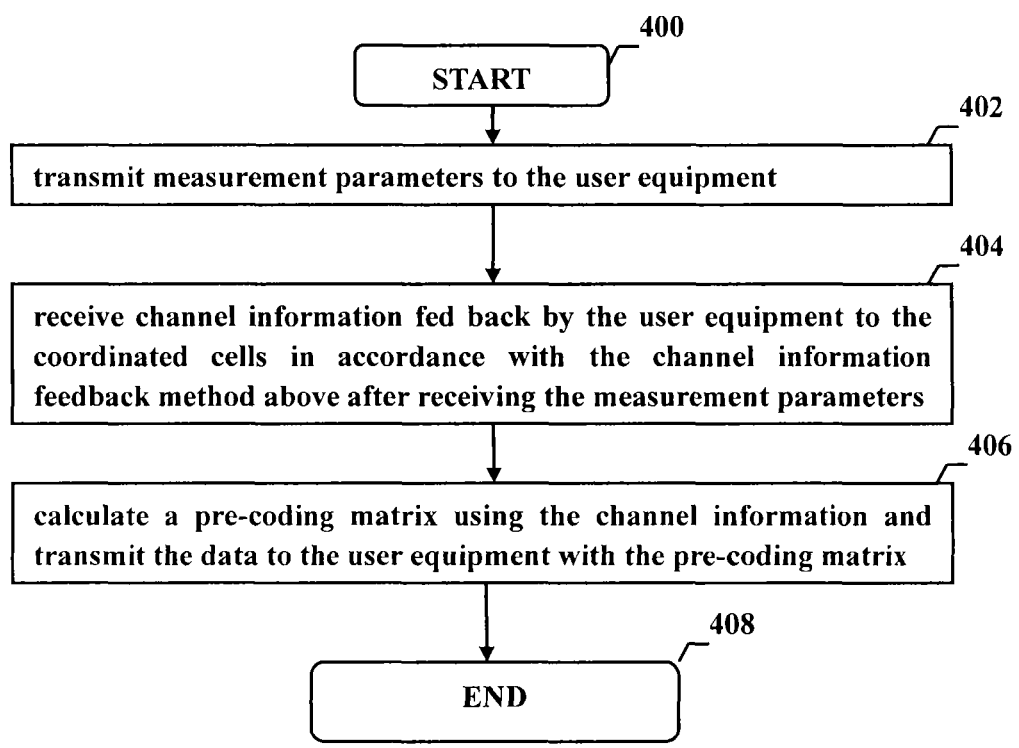
FIG. 4 is a flow chart illustrating a method of transmitting data according to a third embodiment of the present invention.

The third embodiment of the present invention is described below in conjunction with FIG. 4. FIG. 4 is a flow chart illustrating a method of transmitting data to a user equipment in the coordinated cells according to the third embodiment of the present invention.

The method starts in step 400. In step 402, measurement parameters are transmitted to the user equipment.

The measurement parameters may be transmitted from coordinated the cells to the UE, and then the UE may use the measurement parameters to measure channel quality of downlink channels from the coordinated cells to the UE. The measurement parameters may be, e.g., measurement bandwidth or feedback period and so on. In addition, the measurement parameters may also be preset in the UE, without being transmitted from the coordinated cells to the UE. It is noted that the measurement parameters are not necessary for measuring the channel quality, i.e., channel quality measurement can be carried out without the measurement parameters. Those skilled in the art will appreciate that various channel quality measurement methods known in the art can be used to measure the channel quality of downlink channels from the coordinated cells to the UE, as long as the channel quality of downlink channels from the coordinated cells to the UE can be obtained.

Then, in step 404, channel information fed back by the user equipment to the coordinated cells in accordance with the channel information feedback method above after receiving the measurement parameters is received.

As described above, after receiving the measurement parameters transmitted from the coordinated cells, the UE may determine the channel information and transmit it to the coordinated cells in accordance with the channel information feedback method above. The coordinated cells may receive the channel information transmitted from the UE. The channel information feedback method is described in detail above, and thus the details thereof are omitted here.

Then, in step 406, a pre-coding matrix is calculated using the channel information and the data is transmitted to the user equipment with the pre-coding matrix.

On receipt of the channel information transmitted by the UE, the coordinated cells may reconstruct downlink channel information using the channel information, calculate a pre-coding matrix using the reconstructed downlink channel information, and transmit data to the UE with the pre-coding matrix.

The method ends in step 408.

Fourth Embodiment

Figure 5:
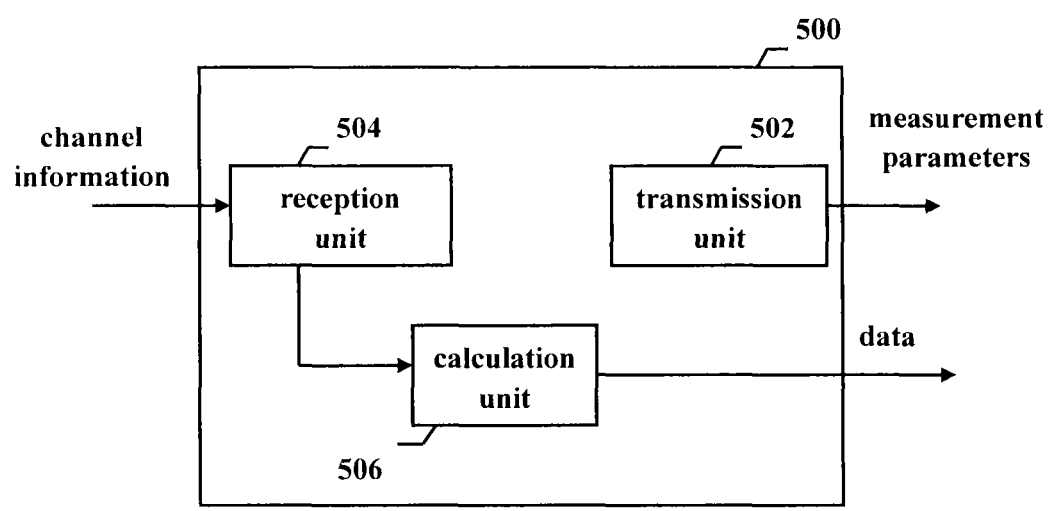
FIG. 5 is a block diagram illustrating a base station according to a fourth embodiment of the present invention.

The fourth embodiment of the present invention is described below in conjunction with FIG. 5. FIG. 5 is a block diagram illustrating a base station of transmitting data to a user equipment in the coordinated cells according to a fourth embodiment of the present invention.

As shown in FIG. 5, the device 500 includes a transmission unit 502, a reception unit 504 and a calculation unit 506. The transmission unit 502 is configured to transmit measurement parameters to the user equipment; the reception unit 504 is configured to receive channel information fed back by the user equipment to the coordinated cells in accordance with the channel information feedback method above after receiving the measurement parameters; and the calculation unit 506 is configured to calculate a pre-coding matrix using the channel information and transmit the data to the user equipment with the pre-coding matrix. The channel information feedback method is described in detail above, and thus the details thereof are omitted here.

The device 500 according to the fourth embodiment of the present invention corresponds to the method according to the third embodiment of the present invention, and thus the details thereof are omitted here.

Fifth Embodiment

Figure 6:
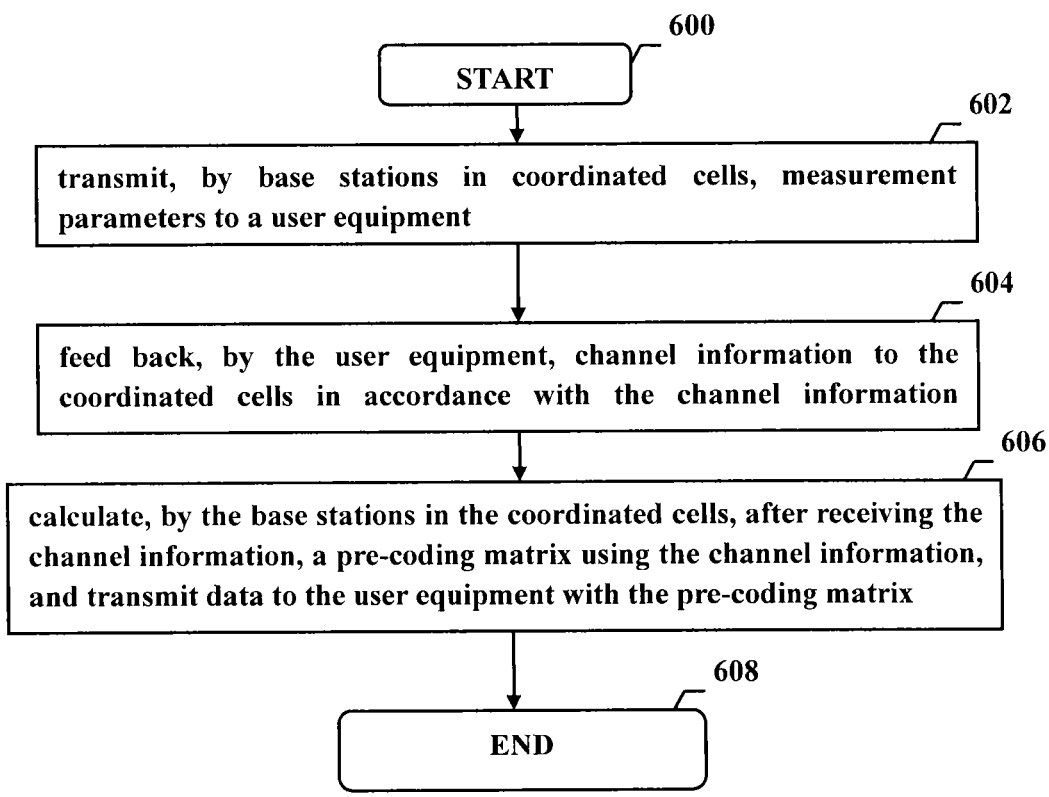
FIG. 6 is a flow chart illustrating a wireless communication method according to a fifth embodiment of the present invention.

The fifth embodiment of the present invention is described below in conjunction with FIG. 6. FIG. 6 is a flow chart illustrating a wireless communication method according to the fifth embodiment of the present invention.

The method starts in step 600. In step 602, base stations in coordinated cells transmit measurement parameters to a user equipment.

The measurement parameters may be transmitted from base stations in coordinated cells to a UE, and then the UE may use the measurement parameters to measure channel quality of downlink channels between the coordinated cells and the UE. The measurement parameters may be, e.g., measurement bandwidth or feedback period and so on. In addition, the measurement parameters may also be preset in the UE, without being transmitted from the base stations in the coordinated cells to the UE. It is noted that the measurement parameters are not necessary for measuring the channel quality, i.e., channel quality measurement can be carried out without the measurement parameters. Those skilled in the art will appreciate that various channel quality measurement methods known in the art can be used to measure the channel quality of downlink channels between the coordinated cells and the UE, as long as the channel quality of downlink channels between the coordinated cells and the UE can be obtained.

Then, in step 604, the user equipment feeds back channel information to the coordinated cells in accordance with the channel information feedback method above after receiving the measurement parameters.

As described above, after receiving the measurement parameters transmitted from the base stations in the coordinated cells, the UE may determine the channel information and transmit it to the coordinated cells in accordance with the channel information feedback method above. The base stations in the coordinated cells may receive the channel information transmitted from the UE. The channel information feedback method is described in detail above, and thus the details thereof are omitted here.

Then, in step 606, after receiving the channel information, the base stations in the coordinated cells calculates a pre-coding matrix using the channel information, and transmits data to the user equipment with the pre-coding matrix.

On receipt of the channel information transmitted by the UE, the base stations in the coordinated cells may reconstruct downlink channel information using the channel information, calculate a pre-coding matrix using the reconstructed downlink channel information, and transmit data to the UE with the pre-coding matrix.

The method ends in step 608.

Sixth Embodiment

Figure 7:
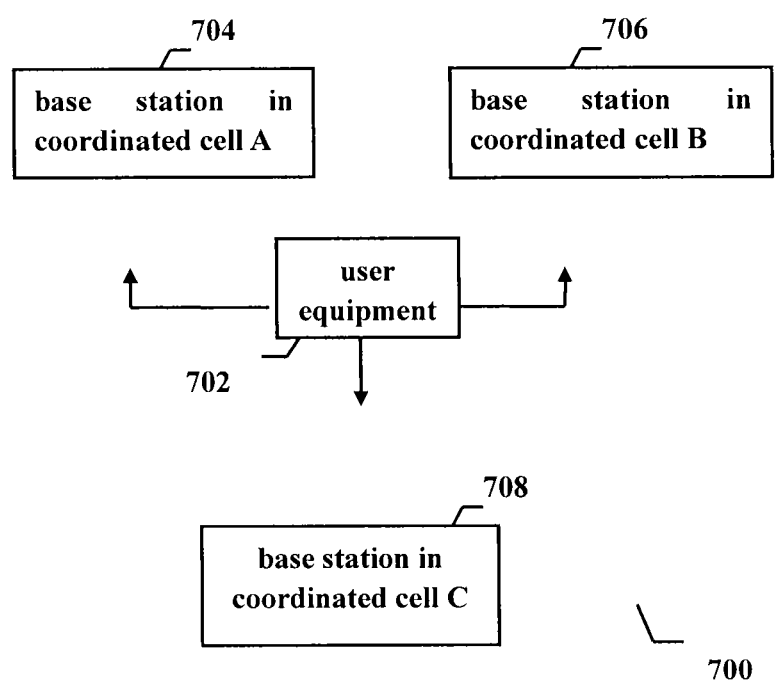
FIG. 7 is a block diagram illustrating a wireless communication system according to a sixth embodiment of the present invention.

The sixth embodiment of the present invention is described below in conjunction with FIG. 7. FIG. 7 is a block diagram illustrating a wireless communication system according to the sixth embodiment of the present invention.

As shown in FIG. 7, the device 700 includes a user equipment 702, a base station 704 in a coordinated cell A, a base station 706 in a coordinated cell B and a base station 708 in a coordinated cell C. The base stations 704, 706 and 708 transmit measurement parameters to the user equipment 702, receive channel information fed back by the user equipment 702, calculate a pre-coding matrix using the channel information and transmit data to the user equipment 702 with the pre-coding matrix. The user equipment 702 feeds back the channel information to the coordinated cells in accordance with the channel information feedback method above after receiving the measurement parameters. The channel information feedback method is described in detail above, and thus the details thereof are omitted here. Those skilled in the art will appreciate that although FIG. 7 shows only one user equipment 702 and three base stations in coordinated cells, the present invention is not limited to any specific implementation and may be applied to the case where there are different number of user equipments or different number of base stations in coordinated cells.

The device 700 according to the sixth embodiment of the present invention corresponds to the method according to the fifth embodiment of the present invention, and thus the details thereof are omitted here.

Seventh Embodiment

Figure 8:
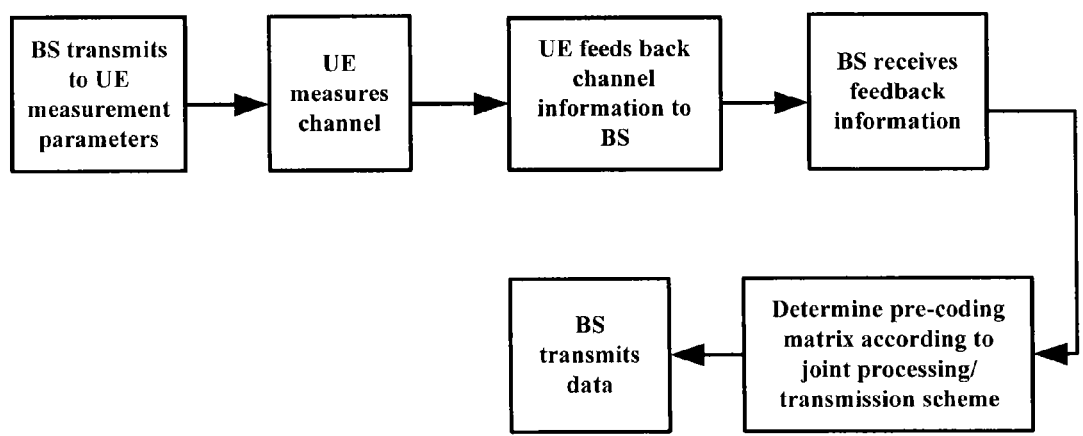
FIG. 8 is a flow chart illustrating a method of feeding back channel information according to a seventh embodiment of the present invention.

The seventh embodiment of the present invention is described below in conjunction with FIG. 8. FIG. 8 is a flow chart illustrating a method of feeding back channel information according to the seventh embodiment of the present invention.

As shown in FIG. 8, firstly, base stations (BS) in all of the coordinated cells transmit measurement parameters to a UE through a downlink control channel. Then, the UE measures downlink channels through a measuring process by itself, and feeds back quantized channel information to the base stations in respective coordinated cells according to the channel information feedback method above, using a channel matrix H and downlink channel qualities between the coordinated cells and the UE obtained from the measuring process. On receipt of the feedback from the UE, the base stations in respective coordinated cells calculate a pre-coding matrix and transmit data according to the method of joint processing/transmission.

Assuming a set of coordinated cells C={1, 2, . . . , K} and the channel information matrix of the jth coordinated cell measured by the UE is represented by $H_j$ (j=1, 2, . . . , K), H=[$H_1$ $H_2$ . . . $H_K$], with U, $\Sigma$ and V individually denotes a left singular matrix, an eigenvalue matrix and a right singular matrix obtained from the singular value decomposition (SVD) of H, then, $$H = U\Sigma V^H$$

Define h=$\Sigma V^H$=[$h_1$ $h_2$ . . . $h_K$], where $h_j$ is the effective channel of the jth coordinated cell. It is assumed that there may be three coordinated cell classes: a class with the highest channel quality, a class with the moderate channel quality and a class with the lowest channel quality. Assuming there are M coordinated cells in the class with the highest channel quality, the effective channel corresponding to this cell class is given by [$h_1$ $h_2$ . . . $h_M$]; and assuming there are N coordinated cells in the class with the moderate channel quality, the effective channel corresponding to this cell class is [$h_{M+1}$ $h_{M+2}$ . . . $h_{M+N}$]; then, there are K-M-N coordinated cells in the class with the lowest channel quality, the effective channel corresponding to this cell class is [$h_{M+N+1}$ $h_{M+N+2}$ . . . $h_K$]. Moreover, trace (•) denotes the trace of a matrix, $\bullet^H$ denotes the conjugate transpose of a matrix, and (•)$^\dagger$ denotes a pseudoinverse of a matrix. The channel information is fed back as described below.

Step 1: the channel information to be fed back for the coordinated cell class with the highest channel quality is calculated. The coordinated cell class with the highest channel quality is given with the highest level of feedback enhancement, e.g., both the sequence number of a codebook corresponding to the effective channel quantization information of the respective coordinated cells and the sequence number of a codebook corresponding to the inter-coordinated-cell phase correction angle information are fed back, and the channel information to be fed back is determined according to the rule that the correlation between the channel quantization matrix and the ideal channel matrix is maximized, for example, according to Expression (1):

$$(a_1, a_2, \ldots, a_M, b_1, b_2, \ldots, b_M) = \underset{\substack{a_j=1,2,\ldots,A \\ b_j \in 1,2\ldots B, j=1,2,\ldots M}}{\mathrm{argmax}} \quad \text{Expression (1)}$$

$$(\mathrm{trace}([\theta_{a_1} w_{b_1} \theta_{a_2} w_{b_2} \ldots \theta_{a_M} w_{b_M}][h_1 h_2 \ldots h_M]^H))$$

where $a_j$ denotes the sequence number of the codebook of the phase correction angle information quantization fed back to the jth coordinated cell in the coordinated cell class; $\theta_{a_j}$ denotes the predefined codebook corresponding to the sequence number $a_j$; $b_j$ denotes the sequence number of the codebook of the effective channel quantization fed back to the jth coordinated cell in the coordinated cell class; $w_{b_j}$ denotes the predefined codebook corresponding to the sequence number $b_j$; A denotes the size of the codebook of the inter-coordinated-cell phase correction angle information quantization; and B denotes the size of the codebook of the effective channel information quantization matrix. Therefore, the coordinated cell class with the highest channel quality is given with great feedback enhancement. In addition to the feedback of the codebook of the effective channel quantization matrix of the respective cells, the information of the inter-coordinated-cell phase correction angle is also fed back, and the information to be fed back is determined based on the rule of joint optimization.

Step 2: On the basis of the determination of channel information to be fed back for the coordinated cell class with the highest channel quality, the channel information to be fed back for the coordinated cell class with the moderate channel quality is calculated. The coordinated cell class with the moderate channel quality is given with a level of feedback enhancement less than the coordinated cell class with the highest channel quality, e.g., both the sequence number of a codebook corresponding to the effective channel quantization information of the coordinated cells and the sequence number of a codebook corresponding to the inter-coordinated-cell phase correction angle information are fed back, but the channel information to be fed back is not determined based on the rule of joint optimization, instead, according to the two separate steps below:

Step 2-1: Based on the maximum correlation criterion, the sequence numbers of codebook corresponding to the channel quantization information of respective coordinated cells are calculated independently, for example, according to Expression (2):

$$b_i = \underset{b_i=1,2,\ldots,B}{\operatorname{argmax}} (\operatorname{trace}(w_{b_i} h_i^H)), \quad \text{Expression (2)}$$
$$i = M+1, M+2, \ldots, M+N$$

Step 2-2: Based on the determined $b_j$, as according to the maximum correlation criterion, the sequence numbers of codebook corresponding to the phase correction angle quantization information of respective coordinated cells are calculated jointly, for example, according to Expression (3):

$$(a_{M+1}, a_{M+2}, \ldots, a_{M+N}) = \underset{a_j=1,2,\ldots,A}{\operatorname{argmax}} \quad \text{Expression (3)}$$
$$\left(\operatorname{trace}\left([P_1 \theta_{a_{M+1}} w_{b_{M+1}} \theta_{a_{M+2}} w_{b_{M+2}} \ldots \theta_{a_{M+N}} w_{b_{M+N}}]\right.\right.$$
$$\left.\left.[\tilde{h}_1 h_{M+1} h_{M+2} \ldots h_{M+N}]^H\right)\right)$$

where N in Expressions (2) and (3) denotes the number of coordinated cells in the coordinated cell class; $P_1=[\theta_{a_1} w_{b_1} \theta_{a_2} w_{b_2} \ldots \theta_{a_M} w_{b_M}]$ denotes the feedback information for the respective coordinated cells in the coordinated cell class with the highest channel quality that has been determined; for the convenience of the description, $h_1[h_1\ h_2\ \ldots\ h_M]$ denotes the effective channel corresponding to the coordinated cell class with the highest channel quality; $a_j$ denotes the sequence number of codebook of the phase correction angle information quantization fed back to the jth coordinated cell in the coordinated cell class; $\theta_{a_j}$ denotes the predefined codebook corresponding to the sequence number $a_j$; $b_j$ denotes the sequence number of codebook of the effective channel quantization fed back to the jth coordinated cell in the coordinated cell class; $w_{b_j}$ denotes the predefined codebook corresponding to the sequence number $b_j$; A denotes the size of codebook of the inter-coordinated-cell phase correction angle information quantization; and B denotes the size of codebook of the effective channel information quantization matrix. That is, on the basis of the determination of channel information to be fed back for the coordinated cell class with the highest channel quality, the channel information to be fed back for the coordinated cell class with the moderate channel quality is calculated. Moreover, the coordinated cell class with the moderate channel quality is given with a level of feedback enhancement less than the coordinated cell class with the highest channel quality, for example, the calculation manner of the channel information to be fed back in step 2 is inferior to the calculation manner of the channel information to be fed back in step 1.

Step 3: on the basis of the determination of channel information to be fed back for the two coordinated cell classes above, the channel information to be fed back for the coordinated cell class with the lowest channel quality is calculated. The coordinated cell class with the lowest channel quality is given with a level of feedback enhancement less than the coordinated cell class with the moderate channel quality, e.g., only the sequence number of a codebook corresponding to the effective channel quantization information of the coordinated cells is fed back, while the inter-coordinated-cell phase correction angle information is not fed back. The channel information to be fed back may be determined based on the maximum correlation criterion, for example, according to Expression (4):

$$(b_{M+N+1}, b_{M+N+2}, \ldots, b_K) = \quad \text{Expression (4)}$$
$$\underset{b_j=1,2,\ldots,B}{\operatorname{argmax}} \left(\operatorname{trace}\left([P_1 P_2 w_{b_{M+N+1}} w_{b_{M+N+2}} \ldots w_{b_K}]\right.\right.$$
$$\left.\left.[\tilde{h}_1 \tilde{h}_2 h_{M+N+1} h_{M+N+2} \ldots h_K]^H\right)\right)$$

where $P_1=[\theta_{a_1} w_{b_1} \theta_{a_2} w_{b_2} \ldots \theta_{a_M} w_{b_M}]$ denotes the feedback information for the respective coordinated cells in the coordinated cell class with the highest channel quality that has been determined; $P_2=[\theta_{a_{M+1}} w_{b_{M+1}} \theta_{a_{M+2}} w_{b_{M+2}} \ldots \theta_{a_{M+N}} w_{b_{M+N}}]$ denotes the feedback information for the respective coordinated cells in the coordinated cell class with the moderate channel quality that has been determined; $\tilde{h}_1=[h_1\ h_2\ \ldots\ h_M]$ and $\tilde{h}_2=[h_{M+1}\ h_{M+2}\ \ldots\ h_{M+N}]$ individually denote the effective channel corresponding to the coordinated cell class with the highest channel quality and the effective channel corresponding to the coordinated cell class with the moderate channel quality; $b_j$ denotes the sequence number of codebook of the effective channel quantization fed back to the jth coordinated cell in the coordinated cell class; $w_{b_j}$ denotes the predefined codebook corresponding to the sequence number $b_j$; and B denotes the size of codebook of the effective channel information quantization matrix. That is, on the basis of the determination of channel information to be fed back for the other coordinated cell classes, the channel information to be fed back for the coordinated cell class with the lowest channel quality is calculated. Moreover, the coordinated cell class with the lowest channel quality is given with a level of feedback enhancement less than the coordinated cell class with the moderate channel quality.

Finally, the determined feedback is $(a_1, a_2, \ldots, a_{M+N}, b_1, b_2, \ldots, b_K)$, where $a_j$ denotes the sequence number of codebook of the phase correction angle information quantization fed back to the jth coordinated cell in the coordinated cell class; and $b_j$ denotes the sequence number of codebook of the effective channel quantization fed back to the jth coordinated cell in the coordinated cell class.

Eighth Embodiment

Figure 9:
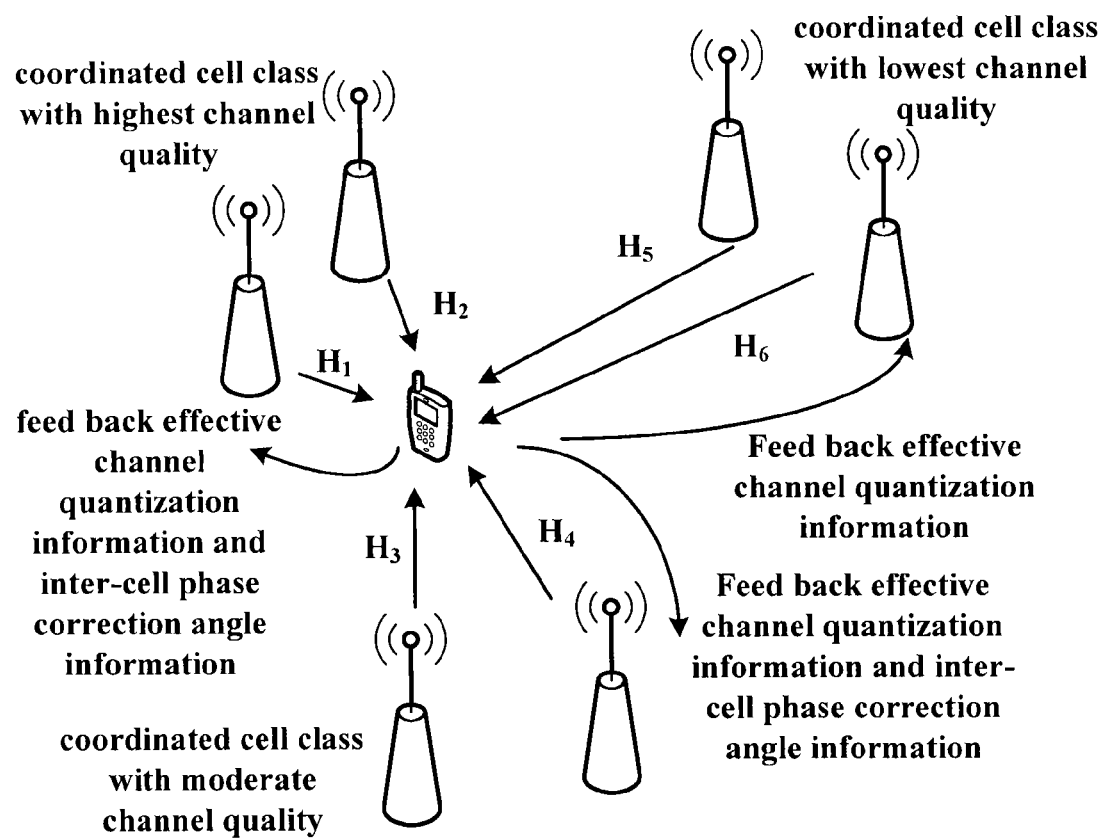
FIG. 9 is a schematic diagram illustrating single-user channel information feedback according to an eighth embodiment of the present invention.

The eighth embodiment of the present invention is described below in conjunction with FIG. 9. FIG. 9 is a schematic diagram illustrating single-user channel information feedback according to the eighth embodiment of the present invention.

As shown in FIG. 9, the set of coordinated cells include six base stations, each of which is equipped with four transmitting antennas; and the UE is equipped with two receiving antennas. The transmitting of data and feeding back of channel information are described below, with representing the downlink channel matrix between the jth coordinated cell and the UE.

1. The base stations in respective coordinated cells inform the UE, through a downlink control channel, of measurement parameters such as measurement bandwidth or feedback period and so on.

2. The UE estimates the downlink channels from pilot signals sent from the respective base stations, and measures the channel qualities.

3. The coordinated cells are classified based on the channel qualities (e.g., into three classes, each of which includes two coordinated cells), and the feedback information is calculated based on the measured channels.

3-1. The channel information to be fed back for the coordinated cell class with the highest channel quality is calculated based on the maximum correlation criterion, for example, according to Expression (5):

$$(a_1, a_2, b_1, b_2) = \underset{\substack{a_j=1,2,\ldots A, j=1,2 \\ b_j \in 1,2 \ldots B, j=1,2}}{\operatorname{argmax}} (\operatorname{trace}([\theta_{a_1} w_{b_1} \theta_{a_2} w_{b_2}][h_1 h_2]^H)) \quad \text{Expression (5)}$$

For example, the obtained result $(a_1, a_2, b_1, b_2)=(2, 5, 1, 3)$ indicates that sequence numbers 1 and 3 of codebook of the effective channel quantization are fed back, and the sequence numbers of 2 and 5 of codebook of the phase correction angle information quantization are fed back, respectively.

3-2. The channel information to be fed back for the coordinated cell class with the moderate channel quality is calculated based on the maximum correlation criterion.

The sequence number of codebook of the effective channel quantization is determined firstly, e.g., according to Expression (6):

$$b_i = \underset{b_i=1,2,\ldots ,B}{\operatorname{argmax}} (\operatorname{trace}(w_{b_i} h_i^H)), i = 3, 4 \quad \text{Expression (6)}$$

Then, based on $(a_1, a_2, b_1, b_2)$ and $b_3, b_4$ that have been determined, the sequence number of codebook of the phase correction angle information quantization is calculated, e.g., according to Expression (7):

$$(a_3, a_4) = \underset{a_j=1,2,\ldots A, j=3,4}{\operatorname{argmax}} (\operatorname{trace}([P_1 \theta_{a_3} w_{b_3} \theta_{a_4} w_{b_4}][\tilde{h}_1 h_3 h_4]^H)) \quad \text{Expression (7)}$$

For example, the obtained result $(a_3, a_4, b_3, b_4)=(2, 4, 3, 1)$ indicates that sequence numbers 3 and 1 of codebook of the effective channel quantization are fed back, and the sequence numbers of 2 and 4 of codebook of the phase correction angle information quantization are fed back, respectively.

3-3. The channel information to be fed back for the coordinated cell class with the lowest channel quality is calculated based on the maximum correlation criterion, for example, according to Expression (8):

$$(b_5, b_6) = \underset{b_i=1,2,\ldots ,B}{\operatorname{argmax}} (\operatorname{trace}([P_1 P_2 w_{b_5} w_{b_6}][\tilde{h}_1 \tilde{h}_2 h_5 h_6]^H)) \quad \text{Expression (8)}$$

For example, the obtained result $(b_5, b_6)=(4, 5)$ indicates that sequence numbers 4 and 5 of codebook of the effective channel quantization are fed back.

Finally, the determined sequence numbers of codebook to be fed back are given by:

$(a_1, a_2, a_3, a_4, b_1, b_2, b_3, b_4, b_5, b_6)=(2,5,2,4, 1,3,3, 1,4,5)$

The UE feeds back the sequence numbers to the base stations in the respective coordinated cells through an uplink channel.

4. On receipt of the sequence numbers of codebook fed back, the base stations in the respective coordinated cells reconstruct the downlink channel information, for example, $$\tilde{h}=[\theta_{a_1} w_{b_1}, \theta_{a_2} w_{b_2}, \theta_{a_3} w_{b_3}, \theta_{a_4} w_{b_4}, w_{b_5} w_{b_6}]$$

and use the reconstructed downlink channel information to calculate a pre-coding matrix, for example:

$$\text{precode} = \tilde{h}^\dagger = [\text{pre}_1; \text{pre}_2; \ldots ; \text{pre}_6]$$

where $\text{pre}_j$ denotes the pre-coding vector of the jth coordinated cell.

Ninth Embodiment

The ninth embodiment of the present invention is described below.

The ninth embodiment addresses multi-user channel information feedback. The multi-user feedback process is similar to the single-user feedback process above. In the case of multiple users, the calculation process for single-user feedback is carried out for each of the users. The difference lies in the process for the base station to calculate the pre-coding matrix. It is assumed that there are five base station and five user equipments. Each of the base stations is equipped with four transmitting antennas. Each of the user equipments is equipped with two transmitting antennas, and data is transmitted to each user equipment. Assuming the downlink channel information matrix of the jth coordinated cell measured by the ith UE is represented by $H_{i,j}$ (i=1, 2, ... 5, j=1, 2, ... 5), $H_i=[H_{i,1} H_{i,2} \ldots H_{i,5}]$ with $U_i, \Sigma_i, V_i$ denote a left singular matrix, an eigenvalue matrix and a right singular matrix obtained from the singular value decomposition (SVD) of $H_i$, respectively, then, $$H_i = U_i \Sigma_i V_i^H$$

Define $[h]_i = \Sigma_i V_i^H = [h_{i,1} h_{i,2} \ldots h_{i,K}]$, where $h_{i,j}$ is the effective channel from the ith UE to the jth coordinated cell.

A specific implementation and the feeding back of the channel information are described below.

1. The base stations in respective coordinated cells inform the user equipments, through a downlink control channel, of measurement parameters such as measurement bandwidth or feedback period and so on.

2. The user equipments estimate the downlink channels from the base stations in the respective coordinated cells to the user equipments based on pilot signals sent from the base stations, and measure the channel qualities.

3. The user equipments classify the coordinated cells based on the measured channel qualities (it is assumed that with respect to the ith UE, the coordinated cells are classified into two classes, the first one includes two coordinated cells and the second one includes three coordinated cells), and calculate the channel information to be fed back based on the measured channels. Those skilled in the art will appreciate that with respect to the five user equipments, the coordinated cells may be classified differently, and the five user equipments may calculate respective feedback channel information according to the following steps 3-1 to 3-3 in parallel.

3-1. The channel information to be fed back for the coordinated cell class with the highest channel quality is calculated based on the maximum correlation criterion, for example, according to the following Expression:

$$(a_{i,1}, a_{i,2}, b_{i,1}, b_{i,2}) = \underset{\substack{a_{i,1}=1,2,\ldots A \\ b_{i,1} \in 1,2 \ldots B}}{\operatorname{argmax}} \left( \operatorname{trace}\left(\left[\theta_{a_{i,1}} w_{b_{i,1}} \theta_{a_{i,2}} w_{b_{i,2}}\right] [h_{i,1} h_{i,2}]^H\right)\right)$$

For example, the obtained result $(a_{i,1}, b_{i,1}, a_{i,2}, b_{i,2})=(2, 3, 3, 1)$ indicates that the ith UE feeds back to the coordinated cell class the sequence numbers 3 and 1 of codebook of the effective channel quantization, and the sequence numbers of 2 and 3 of codebook of the phase correction angle information quantization.

3-2. The channel information to be fed back for the coordinated cell class with the moderate channel quality is calculated based on the maximum correlation criterion, for example, according to the following Expression:

$$b_{i,m} = \underset{b_i=1,2,\ldots,B}{\operatorname{argmax}} \left(\operatorname{trace}(w_{b_{i,m}} h_{i,m}^H)\right), m = 3, 4, 5$$

$$(a_{i,3}, a_{i,4}, a_{i,5}) =$$

$$\underset{a_{i,j}=1,2,\ldots A, j=2,3}{\operatorname{argmax}} \left(\operatorname{trace}\left(\left[P_{i,1} \theta_{a_{i,3}} w_{b_{i,3}} \theta_{a_{i,4}} w_{b_{i,4}} \theta_{a_{i,5}} w_{b_{i,5}}\right][\tilde{h}_{i,1} h_{i,3} h_{i,4} h_{i,5}]^H\right)\right)$$

For example, the obtained result $(a_{i,3}, a_{i,4}, a_{i,5}, b_{i,3}, b_{i,4}, b_{i,5})=(5, 3, 2, 3, 1, 4)$ indicates that the ith UE feeds back to the coordinated cell class the sequence numbers 3, 1 and 4 of codebook of the effective channel quantization, and the sequence numbers of 5, 3 and 2 of codebook of the phase correction angle information quantization.

Finally, the determined sequence numbers of codebook to be fed back determined by the UE are given by, for example, $(a_{i,1},a_{i,2},a_{i,3},a_{i,4},a_{i,5},b_{i,1},b_{i,2},b_{i,3},b_{i,4},b_{i,5})=(2,3,5,3,2\ 3,1,3,1,4)$ The UE feeds back the sequence numbers to the base stations in the coordinated cells through an uplink channel.

4. On receipt of the sequence numbers of codebook fed back, the base stations in the respective coordinated cells reconstruct the downlink channel information, for example, $[\tilde{h}]_i=[\theta_{a_{i,1}} w_{b_{i,1}},\theta_{a_{i,2}} w_{b_{i,2}},\theta_{a_{i,3}} w_{b_{i,3}},\theta_{a_{i,4}} w_{b_{i,4}},\theta_{a_{i,5}} w_{b_{i,5}}]$ A pre-coding matrix is calculated using the reconstructed downlink channel information, based on a maximum SLNR joint processing/transmission scheme, for example:

$$\operatorname{precode}_i = [\operatorname{pre}_{i,1}; \operatorname{pre}_{i,2}; \ldots ; \operatorname{pre}_{i,5}] \propto$$

$$\max \cdot eigenvector\left(\left(\sum_{j=1, j\neq i}^{5} [\tilde{h}]_j^H [\tilde{h}]_j + \sigma_i^2 I\right)^\dagger [\tilde{h}]_i^H [\tilde{h}]_i\right)$$

where $\operatorname{pre}_{i,j}$ denotes the pre-vector determined by the jth coordinated cell for the i-user, and the symbol $\propto$ max .eigenvector(•) represents finding the eigenvector corresponding to the largest eigenvalue of the matrix inside the brackets and assigning the found eigenvector to the expression on the left.

Various modifications and alternations can be made by those skilled in the art without deviation from the scope and spirit of the present invention. The selection and description of the embodiments are for illustrating the principle and applications of the present invention, so that the skilled in the art will understand that the present invention may have various implementations with various alternations meeting specific goals.

The invention claimed is:

1. A method of feeding back channel information to coordinated cells, comprising:
   measuring channel quality of downlink channels between the coordinated cells and a user equipment;
   classifying the coordinated cells into different coordinated cell classes based on a measurement result of the channel quality;
   selecting, based on different channel quality intervals corresponding to the different coordinated cell classes, channel information feedback modes with different levels of feedback enhancement for the different coordinated cell classes, respectively; and
   determining channel information to be fed back to coordinated cells in respective coordinated cell classes in a predetermined order with use of the selected channel information feedback modes with different levels of feedback enhancement, and transmitting the determined channel information to the coordinated cells, wherein
   the channel information feedback modes indicate contents of the channel information to be fed back and/or calculation manners for calculating the channel information to be fed back,
   the channel information to be fed back is at least one of effective channel quantization information and phase correction angle information, and
   the calculation manners are one of the following:
      jointly optimizing both the effective channel quantization information and the phase correction angle information simultaneously; and
      calculating the effective channel quantization information independently, and then jointly calculating the phase correction angle information based on the calculated effective channel quantization information.

2. The method according to claim 1, wherein the step of determining comprises:
   determining channel information to be fed back to coordinated cells in respective coordinated cell classes corresponding to the different channel quality intervals, in a descending order of the channel quality of the different channel quality intervals.

3. The method according to claim 2, wherein the step of determining further comprises:
   determining channel information to be fed back to coordinated cells in a second coordinated cell class with use of determined channel information to be fed back to coordinated cells in a first coordinated cell classes, wherein channel quality of the first coordinated cell class is higher than channel quality of the second coordinated cell class.

4. A user equipment of feeding back channel information to coordinated cells, comprising:

a measurement processing circuitry configured to measure channel quality of downlink channels between the coordinated cells and a user equipment;

a classification processing circuitry configured to classify the coordinated cells into different coordinated cell classes based on a measurement result of the channel quality;

a selection processing circuitry configured to select, based on different channel quality intervals corresponding to the different coordinated cell classes, channel information feedback modes with different levels of feedback enhancement for the different coordinated cell classes, respectively; and a determination processing circuitry configured to determine channel information to be fed back to coordinated cells in respective coordinated cell classes in a predetermined order with use of the selected channel information feedback modes with different levels of feedback enhancement, and transmit the determined channel information to the coordinated cells, wherein the channel information feedback modes indicate contents of the channel information to be fed back and/or calculation manners for calculating the channel information to be fed back, the channel information to be fed back is at least one of effective channel quantization information and phase correction angle information, and the calculation manners are one of the following:
jointly optimizing the effective channel quantization information and the phase correction angle information simultaneously; and
calculating the effective channel quantization information independently, and then jointly calculating the phase correction angle information based on the calculated effective channel quantization information.

5. The user equipment according to claim 4, wherein the determination processing circuitry is further configured to:
determine channel information to be fed back to coordinated cells in respective coordinated cell classes corresponding to the different channel quality intervals, in a descending order of the channel quality of the different channel quality intervals.

6. The user equipment according to claim 5, wherein the determination processing circuitry is further configured to:
determine channel information to be fed back to coordinated cells in a second coordinated cell class with use of determined channel information to be fed back to coordinated cells in a first coordinated cell classes, wherein channel quality of the first coordinated cell class is higher than channel quality of the second coordinated cell class.

7. A method of transmitting data to a user equipment in coordinated cells, comprising:
transmitting measurement parameters to the user equipment;
receiving channel information fed back by the user equipment to the coordinated cells using the channel information feedback method of claim 1 after receiving the measurement parameters; and
calculating a pre-coding matrix using the channel information and transmitting the data to the user equipment with the pre-coding matrix.

8. A base station of transmitting data to a user equipment in coordinated cells, comprising:

a transmission processing circuitry configured to transmit measurement parameters to the user equipment;

a reception processing circuitry configured to receive channel information fed back by the user equipment to the coordinated cells using the channel information feedback method of claim 1 after receiving the measurement parameters; and a calculation processing circuitry configured to calculate a pre-coding matrix using the channel information and transmit the data to the user equipment with the pre-coding matrix.

9. A wireless communication method comprising:
transmitting, by base stations in coordinated cells, measurement parameters to a user equipment;
feeding back, by the user equipment, channel information to the coordinated cells using the channel information feedback method of claim 1 after receiving the measurement parameter; and
calculating, by the base stations in the coordinated cells, after receiving the channel information, a pre-coding matrix using the channel information, and transmitting data to the user equipment with the pre-coding matrix.

10. A wireless communication system, comprising:
base stations in coordinated cells; and
a user equipment,
wherein the base stations transmit measurement parameters to the user equipment, receive channel information fed back by the user equipment, calculate a pre-coding matrix using the channel information and transmit data to the user equipment with the pre-coding matrix; and
the user equipment feeds back the channel information to the coordinated cells using the channel information feedback method of claim 1 after receiving the measurement parameters.

11. A non-transitory computer readable storage medium, comprising machine readable program codes which when being executed on an information processing machine, allow the information processing machine to execute the method in claim 1.

12. A non-transitory computer readable storage medium, comprising machine readable program codes which when being executed on an information processing machine, allow the information processing machine to execute the method in claim 7.

13. The method according to claim 1, wherein the step of selecting comprises:
selecting a channel information feedback mode with a higher level of feedback enhancement for a coordinated cell class corresponding to a channel quality interval with higher channel quality, while selecting a channel information feedback mode with a lower level of feedback enhancement for a coordinated cell class corresponding to a channel quality interval with lower channel quality.

14. The user equipment according to claim 4, wherein the selection processing circuitry is further configured to:
select a channel information feedback mode with a higher level of feedback enhancement for a coordinated cell class corresponding to a channel quality interval with higher channel quality, while select a channel information feedback mode with a lower level of feedback enhancement for a coordinated cell class corresponding to a channel quality interval with lower channel quality.

* * * * *